United States Patent [19]

Sugiyama et al.

[11] Patent Number: 5,692,960
[45] Date of Patent: Dec. 2, 1997

[54] HOMOKINETIC JOINT HAVING BALLS WITH AXIAL PLAY IN CAGE POCKETS AND INTERFERENCE FITS BETWEEN INNER AND OUTER RINGS

[75] Inventors: Tatsuro Sugiyama, Haibara-gun; Noriyoshi Yamamoto, Kakegawa; Hisaaki Kura, Iwata, all of Japan

[73] Assignee: NTN Corporation, Osaka, Japan

[21] Appl. No.: 455,555

[22] Filed: May 31, 1995

[30] Foreign Application Priority Data

May 31, 1994 [JP] Japan .................. 6-118643

[51] Int. Cl.$^6$ .................................. F16D 3/223
[52] U.S. Cl. .......................... 464/145; 464/906
[58] Field of Search .................... 464/145, 906, 464/143, 144

[56] References Cited

U.S. PATENT DOCUMENTS

| | | |
|---|---|---|
| 3,012,421 | 12/1961 | Cull ........................ 464/145 X |
| 4,019,347 | 4/1977 | Krude ........................ 464/145 |
| 4,305,263 | 12/1981 | Kako et al. ................. 464/145 |
| 4,589,857 | 5/1986 | Okoshi ....................... 464/145 |
| 4,673,375 | 6/1987 | Adolfsson ................... 464/145 |
| 4,968,287 | 11/1990 | Jacob ........................ 464/145 |

FOREIGN PATENT DOCUMENTS 1446159  8/1976  United Kingdom ............ 464/145

*Primary Examiner*—Daniel P. Stodola
*Assistant Examiner*—Emmanuel M. Marcelo
*Attorney, Agent, or Firm*—Wenderoth, Lind & Ponack

[57] ABSTRACT

The homokinetic joint has an inner ring and and an outer ring formed with axial track grooves so as to be opposite to each other, balls received in the track grooves, a cage mounted between the inner and outer rings and having pockets accommodating the respective balls, whereby torque is transmitted between the inner and outer rings through the balls so that the inner and outer rings will rotate at the same speed. The distance between said track grooves formed in the inner ring and those formed in the outer ring is determined so that the balls are fitted in the grooves between the ring and the inner ring with a predetermined interference, while leaving an axial clearance between the pockets of the cage and the balls. Thus, the balls can roll smoothly with little play in the direction of rotation.

2 Claims, 3 Drawing Sheets

FIG. 1 — PRIOR ART
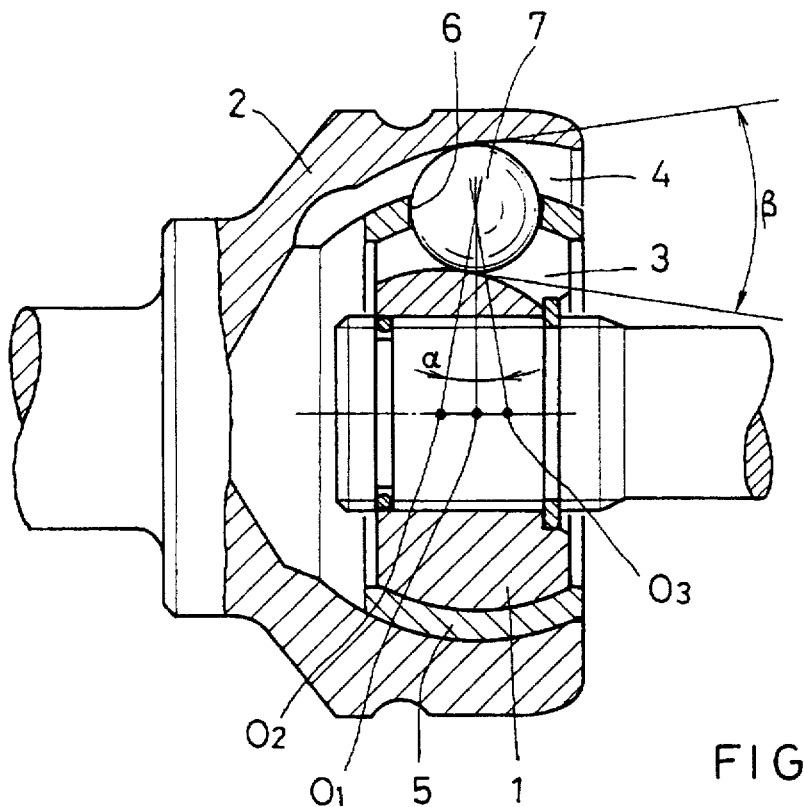
FIG. 2A
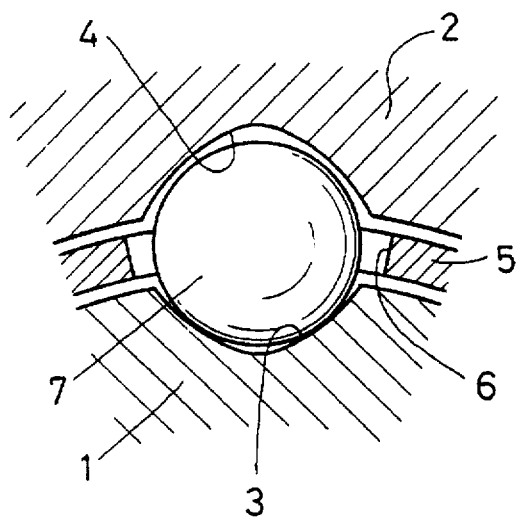
FIG. 2B
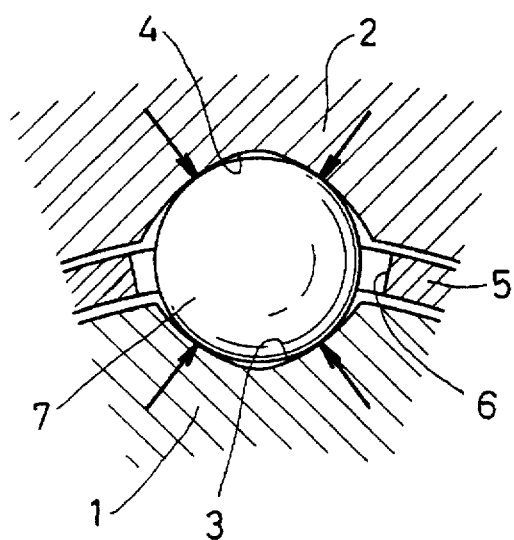

5,692,960

HOMOKINETIC JOINT HAVING BALLS WITH AXIAL PLAY IN CAGE POCKETS AND INTERFERENCE FITS BETWEEN INNER AND OUTER RINGS

BACKGROUND OF THE INVENTION

This invention relates to a homokinetic joint used as a joint for a steering shaft of an automobile.

If a joint of a non-equivelocity nature is used as such a joint, torque transmitted by the joint tends to fluctuate rather wildly particularly while the working angle is large. In order to solve this problem, the use of homokinetic joints, which can reduce fluctuations in transmitted torque within a wide range of working angles, is increasing rapidly these days.

A homokinetic universal joint for a steering shaft has, as shown in FIG. 1, an inner ring 1 and an outer ring 2 both formed with a plurality of axial track grooves 3 and 4, respectively, so as to be opposite to each other. A cage 5 is mounted between the inner ring 1 and the outer ring 2. It has a plurality of pockets 6 each accommodating a ball 7 received in the track grooves 3 and 4.

The track grooves 3 and 4 of the inner ring 1 and outer ring 2 have arcuately curved axial sections having centers of curvature O2 and O3, respectively, that are offset axially to opposite sides from the center of the cage O1 (FIG. 1). Torque is transmitted from the inner ring 1 to the outer ring 2 through the balls 7 so that the inner and outer rings will rotate at the same speed. As is apparent from the cross-section shown in FIG. 2A, each of the track grooves 3 and 4 has two arcuate surfaces that intersect each other at a predetermined angle so that the balls 7 will make angular contact with the track grooves 3, 4 at four points.

Besides the joint described above, homokinetic universal joints such as shown in FIGS. 3 are 4 are also used as steering joints. The joint shown in FIG. 3 has an inner ring 1 and an outer ring 2 formed with track grooves 3 and 4 having straight portions 8 and 9. The track grooves 3 and 4 of the joint shown in FIG. 4 have cross-sections having a curvature larger than the balls.

These joints may have a diametric clearance between the track grooves 3, 4 and the balls (which is equal to the difference between the pitch circle diameter (PCD) of the track grooves 4 of the outer ring and the PCD of the inner ring track grooves 3; hereinafter referred to as "PCD clearance"), and/or an axial clearance between the pockets 6 of the cage 5 and the balls 7 (hereinafter referred to as "pocket clearance"). The PCD clearance affects the rattling of the joint in the direction of rotation, while the pocket clearance affects the axial rattling of the joint.

In conventional joints, the joint has some PCD clearance as shown in FIG. 2A, while the pocket clearance is eliminated by inserting the balls in the pockets with a predetermined interference. With this arrangement, the balls are guided with no axial rattling of the joint eliminated.

On the other hand, for better steerability, an automotive steering mechanism should have as small a play as possible in the direction of rotation. Too large a play would unduly affect the steerability.

But if the PCD clearance, as well as the pocket clearance, of the joint is eliminated by providing an interference between the balls and the track grooves to reduce play in the direction of rotation, torque loss will increase, i.e. the torque transmitted through the joint will increase. Especially if the steering wheel is turned in a low torque region with the steering shaft forming a large working angle, torque loss in the joint as well as torque fluctuation tends to increase to such a level that the steerability worsens markedly.

An object of this invention is to provide a homokinetic joint which can transmit torque smoothly and stably while keeping the play in the direction of rotation as small as possible.

SUMMARY OF THE INVENTION

According to the present invention, there is provided a homokinetic joint characterized in that the distance between the track grooves formed in the inner ring and those formed in the outer ring is determined so that the balls are fitted between said grooves with a predetermined interference, while leaving an axial clearance between the pockets of the cage and the balls.

The joint of the invention has no PCD clearance by fitting the balls in the track grooves with a predetermined interference, leaving only the pocket clearance. Thus, the balls can roll smoothly in spite of the fact that the joint has no play in the direction of rotation. This makes it possible to reduce the rotational torque in a low-torque region.

Although the joint of the invention has some play in an axial direction, a slight amount of axial play will have little influence on steerability of the steering system.

Other features and objects of the present invention will become apparent from the following description made with reference to the accompanying drawings, in which:

BRIEF DESCRIPTION OF THE DRAWINGS

FIG. 1 is a vertical sectional front view of a homokinetic universal joint; same;

FIG. 2A is a cross-section of track grooves of the same;

FIG. 2B is a cross-section of the same track groove showing the state where a ball is fitted with an interference;

DETAILED DESCRIPTION OF THE PREFERRED EMBODIMENT

Figure 3:
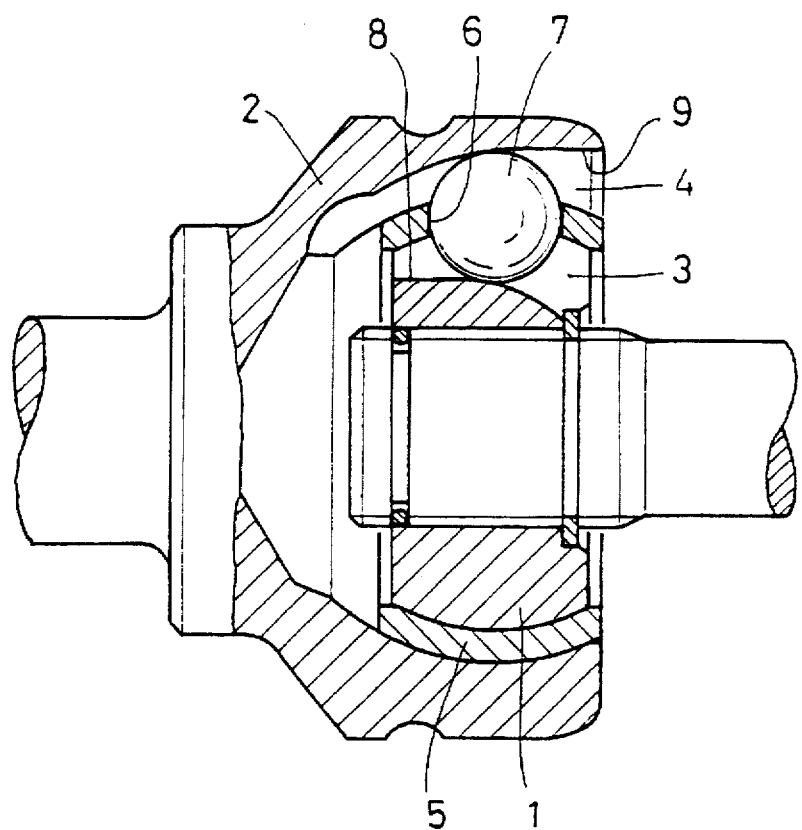
FIG. 3 is vertical sectional front view of a different homokinetic universal joint.

The homokinetic joint of the embodiment is the same in its basic structure as the conventional joint shown in FIG. 1. The only difference is that the distance between the track grooves 3 and 4 of the inner ring 1 and outer ring 2 is smaller than the diameter of the balls 7 (FIG. 2B).

Thus, the balls 7 are fitted in the grooves 3, 4 with an interference.

But an axial clearance (pocket clearance) is provided between each pocket 6 of the cage 5 and the ball 7.

With this arrangement, since the balls 7 are fitted in the track grooves with an interference, the joint has no play in the direction of its rotation. But since the joint has an axial clearance, the balls 7 can smoothly roll in the track grooves in a low torque region. Thus even if the working angle between the input and output shafts of the joint is rather large, torque can be transmitted smoothly and stably. The balls should be fitted in the track grooves with an interference of between 0.005 and 0.050 mm. If less than 0.005 mm, the balls would not be sufficiently pressurized. If more than 0.050 mm, the pressure on the balls would be so high that the torque will be excessive. The pocket clearance should be determined within the range of 0.005–0.040 mm taking into account the dimensional errors of the joint parts.

In the case of a ball type fixed homokinetic universal joint, the offset angle α and the wedge angle β (FIG. 1) formed by the track grooves are both about 14°–16°. Thus, if the joint has a certain pocket clearance, it also serves to create a circumferential play which is about half the size of the pocket clearance. Thus, if it is desired to completely eliminate the circumferential play, the PCD interference has to be set to be equal to half or more than half the size of the pocket clearance. By doing so, it is possible to assure an accurate, stable operation of the joint.

Figure 4:
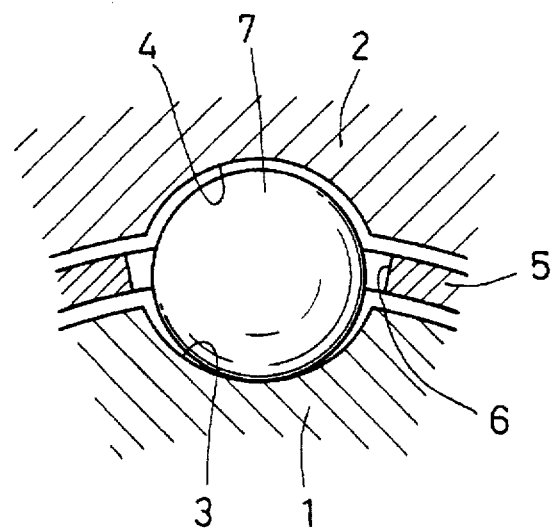
FIG. 4 is a cross-section of track grooves of a different type of joint.

Besides the joint shown in FIG. 1, the concept of the present invention is equally applicable to the homokinetic joints shown in FIGS. 3 and 4.

The homokinetic universal joint of the above-described embodiment is one for use with a steering shaft. But the concept of the present invention is equally applicable to joints for use with any other rotary shaft such as a power steering shaft.

(Experiments)

We conducted an experiment to confirm the effects of the present invention.

In this experiment, we prepared the following three kinds of homokinetic universal joints of the structure shown in FIGS. 1 and 2: a joint having some pocket clearance but no PCD clearance by fitting the balls in the track grooves with an interference (Article according to the invention); a joint having neither PCD clearance nor pocket clearance by providing an interference both between the balls and the track grooves and between the balls and the cage pockets (Control Article 1); and a joint having PCD clearance but not pocket clearance by providing an interference between the balls and the cage pockets (Control Article 2).

In the experiment, we measured the turning torque produced when the inner and outer rings are rotated for each of the three samples while applying loads thereto.

Generally, the torque necessary to turn the steering wheel of a car with a power steering mechanism in a low load region while the car is not moving is about 0.5 kgf.m. Thus, in the experiment, a torque of 0.5 kgf.m was applied to each sample to measure the output torque. The shaft's working angle was kept at 40°, which is relatively large.

From the output torque, input torque and torque variation obtained, we calculated the following three parameters and detected their change with the joint revolving speed.

torque loss percentage=(output torque−input torque)/(input torque)

torque variation percentage=(amount of torque variation)/(input torque)

Max. value=(output torque−input torque+½ of the amount of torque variation)/(input torque)

Figure 5A:
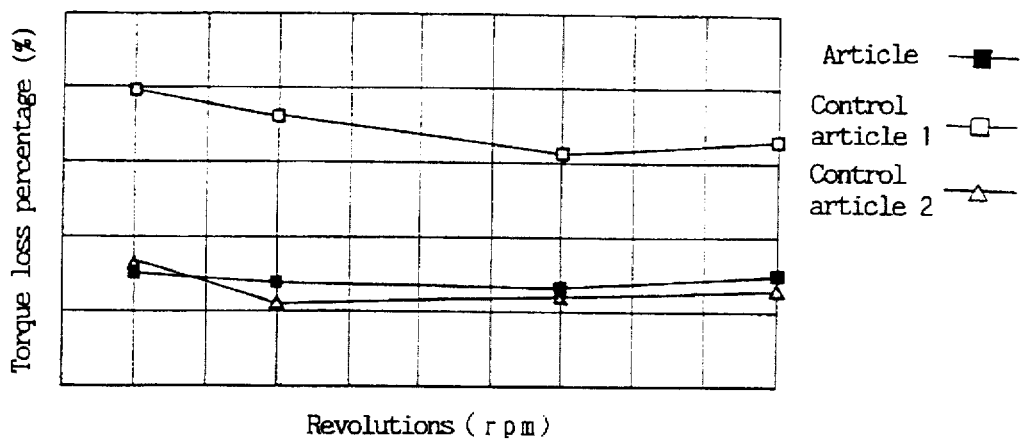
FIG. 5A is a graph showing variation in the torque loss percentage.
Figure 5B:
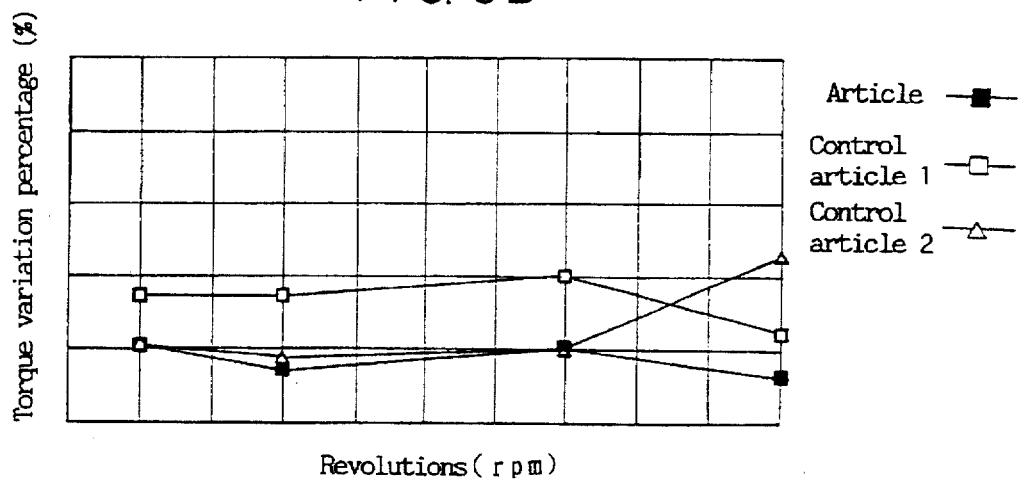
FIG. 5B is a graph showing variation in the torque percentage.
Figure 5C:
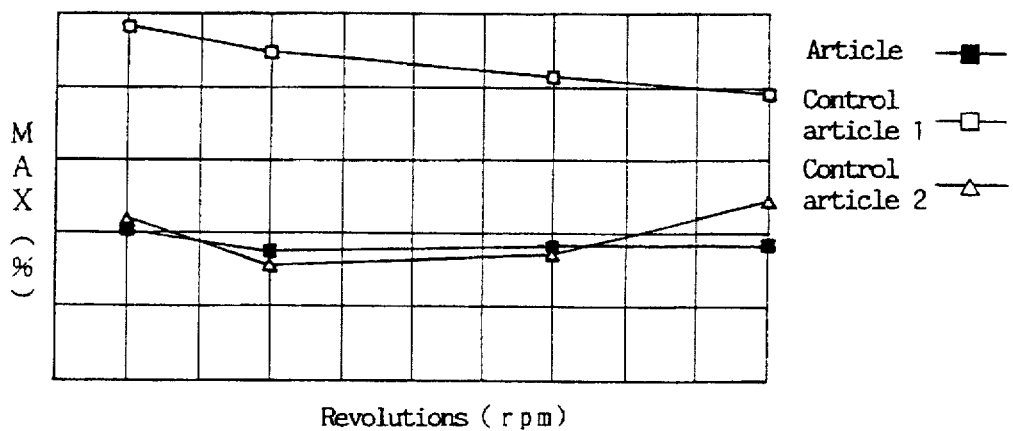
FIG. 5C is a graph showing variation in the Maximum value of torque.

The values obtained are shown in FIGS. 5A–5C.

As shown in these figures, the Article according to the invention and Control Article 2 showed torque loss percentage and torque variation lower by half than those in Control Article 1. In Control Article 2, the torque variation increased sharply with increasing joint revolving speed. In contrast, in the Article of the invention, the torque variation was stable over the entire rpm range.

Thus, it was confirmed that while the input torque is relatively low, Article of the invention, that is, a joint having pocket clearance but not PCD clearance by fitting the balls in the track grooves with an interference, showed the smallest torque loss and was the smoothest in rotation.

As described above, the homokinetic joint according to this invention can rotate smoothly with no play in the direction of its rotation even while the output and input shafts are taking a large working angle relative to each other. By using this joint for a steering shaft, it is possible to attain a stable steerability.

What is claimed is:

1. A homokinetic joint comprising:

an inner ring having an outer surface with outwardly facing, axially arcuate track grooves formed therein;

an outer ring mounted about said inner ring and having an inner surface with inwardly facing, axially arcuate track grooves formed therein and respectively aligned with said track grooves of said inner ring;

balls retained between said track grooves of said outer ring and said track grooves of said inner ring, respectively;

an arcuate cage mounted between said inner ring and said outer ring and having plural pockets in which said balls are received, respectively;

wherein said arcuate cage has a first center of curvature;

wherein said track grooves of said inner ring have a single common center of curvature constituting a second center of curvature;

wherein said track grooves of said outer ring have a single common center of curvature constituting a third center of curvature;

wherein said second and third centers of curvature are respectively offset by equal distances in opposite axial directions from said first center of curvature;

wherein said balls are respectively mounted in said track grooves with interference fits between said balls and said inner and outer rings, respectively; and wherein said balls are respectively mounted in said pockets of said cage with positive axial clearances between said balls and said pockets, respectively.

2. A homokinetic joint as recited in claim 1, wherein said first, second and third centers of curvature are disposed on a center axis of said cage.

* * * * *